(12) United States Patent
Zhang

(10) Patent No.: US 7,987,609 B2
(45) Date of Patent: Aug. 2, 2011

(54) PERPENDICULARITY MEASURING DEVICE

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/753,125

(22) Filed: Apr. 2, 2010

(65) Prior Publication Data
US 2011/0094118 A1  Apr. 28, 2011

(30) Foreign Application Priority Data
Oct. 22, 2009  (CN) .......................... 2009 1 0308649

(51) Int. Cl.
*G01B 5/245* (2006.01)
(52) U.S. Cl. ........................................... 33/535; 33/533
(58) Field of Classification Search .............. 33/501.05, 33/501.08, 533, 535, 613, 645
See application file for complete search history.

(56) References Cited

U.S. PATENT DOCUMENTS

| | | | | |
|---|---|---|---|---|
| 5,131,161 A * | 7/1992 | Drag | ................................. | 33/533 |
| 5,253,425 A * | 10/1993 | Wozniak | .......................... | 33/533 |
| 6,163,972 A * | 12/2000 | Hsu | .................................. | 33/533 |
| 6,195,905 B1* | 3/2001 | Cole | ................................. | 33/533 |
| 6,631,565 B2* | 10/2003 | Wu et al. | .......................... | 33/645 |
| 2009/0106995 A1* | 4/2009 | Zhang et al. | ..................... | 33/533 |
| 2010/0093246 A1* | 4/2010 | Honda et al. | ..................... | 33/533 |

* cited by examiner

*Primary Examiner* — G. Bradley Bennett
(74) *Attorney, Agent, or Firm* — Zhigang Ma

(57) ABSTRACT

A measuring device includes a transfer sleeve, an assist assembly, and a caliper gauge. The transfer sleeve includes two end surfaces and a side surface; the sleeve defines a transfer hole along the longitudinal direction thereof and perpendicular to the end surfaces, and the transfer hole passes through two end surfaces; the transfer sleeve defines a screw hole along the transversal direction thereof in the side surface and communicates with the transfer hole. The assist assembly is screwed in the screw hole, and includes a screw rod, a spring element, and a ball; the screw rod defines a receiving hole therein; the spring element and the ball are inserted into the receiving hole in sequence. The caliper gauge includes a base plate and two side plate extending upright from opposite edges of the base plate correspondingly.

7 Claims, 2 Drawing Sheets

PERPENDICULARITY MEASURING DEVICE

BACKGROUND

1. Technical Field

The present disclosure relates to measuring devices and, particularly, to a measuring device that can measure if a tube is perpendicular to a base from which the tube extends.

2. Description of Related Art

Liquid crystal displays (LCDs) often include a base for supporting a main body (or other elements) of the LCD. To fix the main body to the base, a number of internally threaded tubes perpendicularly extend upwards from the base. As such, the main body can be fixed to the base by screws that match with the tubes. However, due to limited precision of manufacturing process of the base, it is not guaranteed that all tubes are precisely perpendicular to the base. As such, after the main body is assembled to the base, stress induced by those not precisely perpendicular tubes will be applied on the main body. This affects the quality of the LCDs.

Therefore, it is desirable to provide a measuring device which can measure the perpendicularity of a tube of a LCD to the base in order to prevent the above-mentioned limitations.

DETAILED DESCRIPTION

Embodiments of the disclosure are now described in detail with reference to the drawings.

Figure 1:
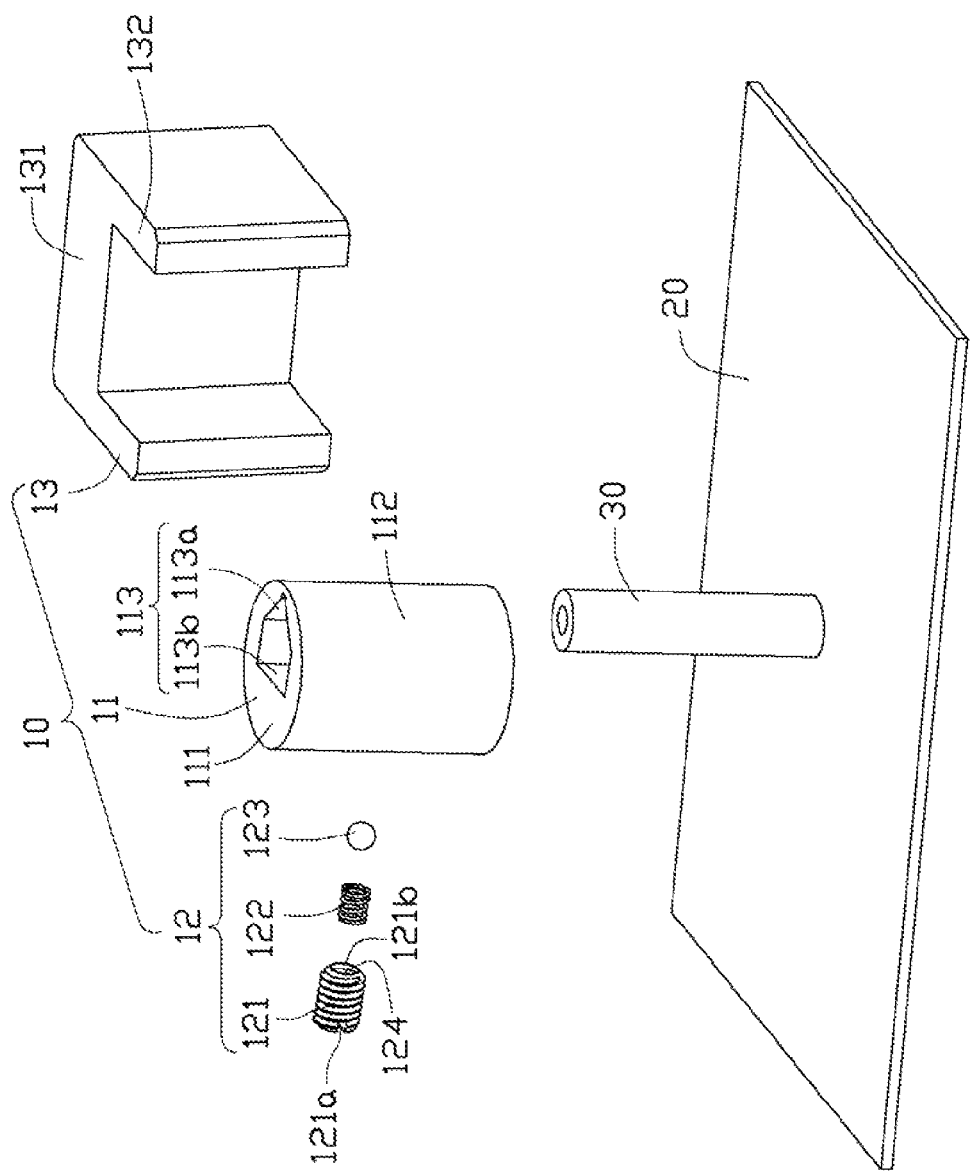
FIG. 1 is an isometric and exploded view of a measuring device for measuring perpendicularity of a tube extending upwards from a base, according to an exemplary embodiment.
Figure 2:
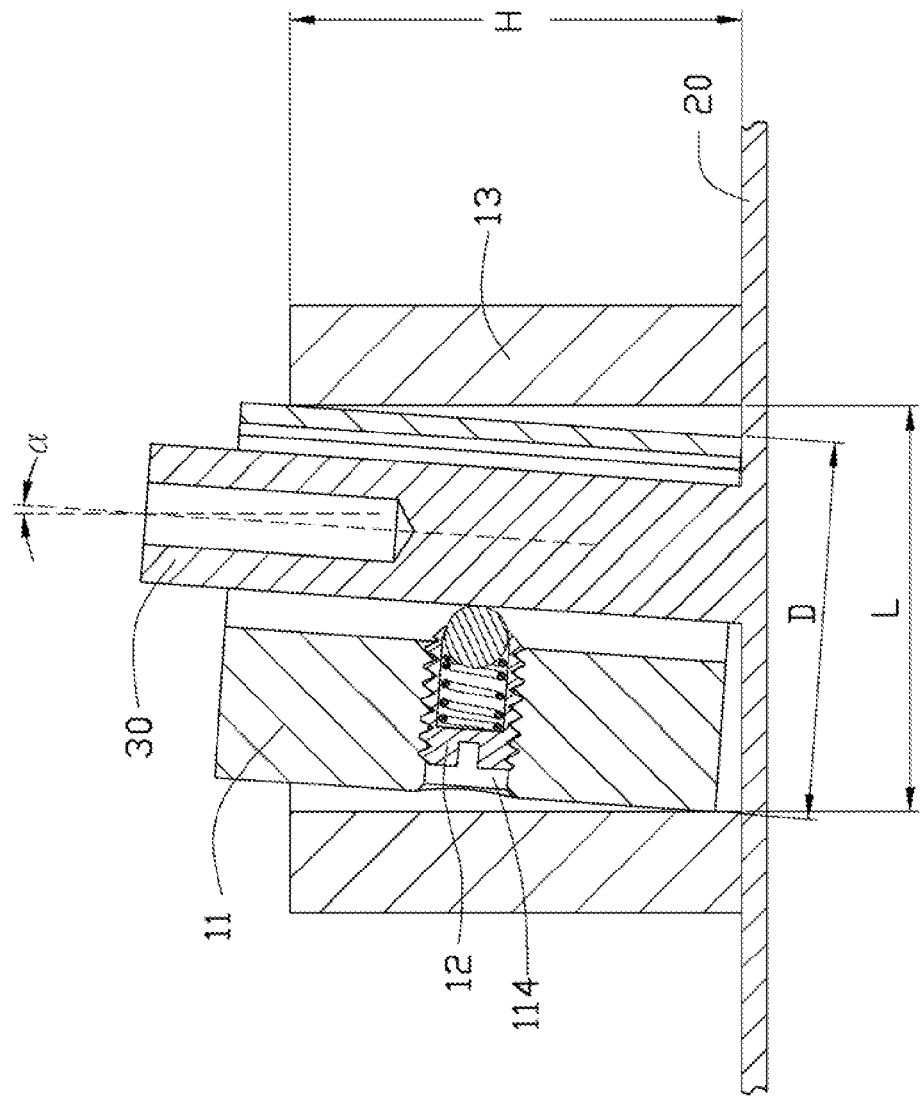
FIG. 2 is cross-sectional view of the measuring device of FIG. 1 when performing the measurement.

Referring to the FIGS. 1-2, a measuring device 10, according to one exemplary embodiment, is configured to measure perpendicularity of internally threaded tubes 30 extending upwards from a base 20. The measuring device 10 includes a transfer sleeve 11, an assist assembly 12, and a caliper gauge 13.

The transfer sleeve 11 is hollow cylinder, and includes two end surfaces 111 and a side surface 112. The transfer sleeve 11 defines a transfer hole 113 along the longitudinal direction thereof and perpendicular to the end surfaces 111, and the transfer hole 113 passes through two end surfaces 111. The cross-section of the transfer hole 113 is a pentagon, and the transfer hole 113 includes two intersected surfaces 113a and a locating surface 113b. The locating surface 113b is not connected with the intersected surfaces 113a but directly faces the intersection of the two intersected surfaces 113a. The transfer sleeve 11 defines a screw hole 114 in the side surface 112 that extends along the transversal direction of the transfer sleeve 11. The screw hole 114 communicates with the transfer hole 113. An axis of the screw hole 114 is perpendicular to the locating surface 113b.

It is noteworthy that in order to achieve other the positioning precisions, the cross-section of the transfer hole 113 can be designed for other polygonal shapes, such as trilateral, or heptagon.

The assist assembly 12 includes a screw rod 121, a spring element 122, and a ball 123. The screw rod 121 defines an operating groove 121a in one end and a recess 121b in the other end. The recess 121b extends inward along the longitudinal direction to form a receiving hole 124. In assembly, the spring element 122 and the ball 123 are inserted into the receiving hole 124 in sequence. The spring element 122 is compressed between the screw rod 121 and the ball 123. As the diameter of the ball 123 is less than the internal diameter of the receiving hole 124 and is larger than the diameter of the recess 121b, the ball 123 is pushed by the spring force of the spring element 122 and partially protrudes from the recess 121b.

It is noteworthy that, before assembling, the diameter of the recess 121b is larger than that of the ball 123. The edge of the recess 121b is bent toward the center thereof after the ball 123 is inserted in, which makes the diameter of recess 121b less than that of the ball 123.

The caliper gauge 13 is U-shaped, and includes a base plate 131 and two side plates 132. The two side plates 132 extend upright from opposite edges of the base plate 241 correspondingly. The distance L between the two side plates 132 satisfies the formulas:

$$L = H^* \tan \alpha + D^* \cos \alpha$$

where H is a height of the caliper gauge 13, D is a diameter of the transfer sleeve 11, and $\alpha$ is a maximum acceptable inclined angle of the tube 30 from the perpendicular direction of the base 20.

The base 20 is a plane plate, and a number of tubes 30 are integrally formed with the base 20. The tubes 30 are configured for receiving threaded screws which are deployed to fix a main body to the base 20.

In measuring, the transfer sleeve 11 sleeves on one tube 30. The assist assembly 12 is screwed into the screw hole 14 of the transfer sleeve 11, and is configured for pushing the tube 20 to completely contact the two intersected surfaces 113a As such, the transfer sleeve 11 includes the same inclined angle, if any, with the tube 30. That is, the inclination of the tube 30 is transferred to the transfer sleeve 11. Then, the caliper gauge 13 is placed on the base 20 and is moved to embrace the tube 30. If the tube 30 can be received between the two side plates 132, the perpendicularity of that tube 30 is acceptable. Otherwise, if the transfer sleeve 11 abuts against the side plates 132, the perpendicularity of the tube 30 is unacceptable. Reworking of the base 20 can be carried out prior to the assembly of the base 20. As such, there will be no or very litter stress applied on the main body.

It is noteworthy that there may be manufacture errors between the diameter of different tubes 30. When the transfer sleeve 11 sleeves on one tube 30, the tube 30 abuts between the two intersected surfaces 113a and the extensible ball 123. Thus, the extensible ball 123 can eliminate the influence of the manufacture errors to the measurement result.

It is noteworthy that when the measuring device 10 is used to measure the other tubes 30 of same batches, the assist assembly 12 screwed in the screw hole 114 does not need to be adjusted again.

It is noteworthy that when the measuring device 10 is used to measure the tubes 30 of different batches but the tubes 30 can also be sleeved in the transfer hole 113 of the same transfer sleeve 11, the measuring device 10 does not need to be changed. The assist assembly 12 just needs to be adjusted to push the tube 20 completely contact with the two intersected surfaces 113a.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A measuring device, comprising:
    a transfer sleeve being a hollow cylinder, and comprising two end surfaces and a side surface; the transfer sleeve defining a transfer hole along the longitudinal direction thereof and perpendicular to the end surfaces, and the transfer hole passing through two end surfaces; the transfer sleeve defining a screw hole along the transversal direction thereof in the side surface and communicating with the transfer hole;
    an assist assembly screwed in the screw hole, and comprising a screw rod, a spring element, and a ball; the screw rod defining a receiving hole therein; the spring element and the ball are inserted into the receiving hole in sequence; and
    a caliper gauge comprising a base plate and two side plate extending upright from opposite edges of the base plate correspondingly; the distance L between the two side plates satisfying the following formula:

$$L = H^* \tan \alpha + D^* \cos \alpha$$

where H is the height of the caliper gauge, D is the diameter of the sleeve, and $\alpha$ is the maximum acceptable inclined angle of a tube from a perpendicular direction of a base from which the tube extend.

2. The measuring device in claim 1, wherein the screw rod defines an operating groove in one end and a recess in the other end, the recess extends along the longitudinal direction to form the receiving hole.

3. The measuring device in claim 2, wherein the diameter of the ball is less than the internal diameter of the receiving hole and is larger than the diameter of the recess.

4. The measuring device in claim 3, wherein the spring element is compressed between the screw rod and the ball, and the ball is partially protruded from the recess.

5. The measuring device in claim 1, wherein the transfer hole comprises two intersected surfaces and a locating surface, the locating surface is not connecting with the intersected surfaces but directly faces the intersection of the two intersected surfaces.

6. The measuring device in claim 5, wherein an axis of the screw hole is perpendicular to the locating surface.

7. The measuring device in claim 1, wherein the transfer sleeve is hollow cylinder.

* * * * *